United States Patent [19]

Engdahl et al.

[11] 4,286,436

[45] Sep. 1, 1981

[54] FALLING FILM FREEZE EXCHANGER

[75] Inventors: Gerald E. Engdahl, Wheaton; James A. Nail, Carol Stream; Vincent F. Allo, Warrenville, all of Ill.

[73] Assignee: Chicago Bridge & Iron Company, Oak Brook, Ill.

[21] Appl. No.: 160,112

[22] Filed: Jun. 16, 1980

[51] Int. Cl.³ .............................. B01D 9/04; C02F 1/22
[52] U.S. Cl. ............................................ 62/123; 62/317; 165/141; 165/142
[58] Field of Search .................. 62/67, 123, 124, 317, 62/532; 165/141, 142

[56] References Cited

U.S. PATENT DOCUMENTS

| | | | |
|---|---|---|---|
| 2,718,279 | 9/1955 | Kraus | 62/532 |
| 3,085,626 | 4/1963 | Bognar et al. | 165/142 |
| 3,924,675 | 12/1975 | Essebaggers | 165/142 |

Primary Examiner—Ronald C. Capossela
Attorney, Agent, or Firm—Merriam, Marshall & Bicknell

[57] ABSTRACT

A falling film freeze exchanger having a plurality of spaced apart vertical freeze tubes secured in, and penetrating, an upper and a lower tube sheet; a cover above the upper tube sheet; a shell around the tube sheets and connected thereto, with said cover supported by the shell; the upper ends of the freeze tubes desirably extending above the upper tube sheet and, optionally, the lower ends of the freeze tubes not being enclosed by the shell; a conduit to deliver a liquid feed stream into a feed box between the upper tube sheet and the cover; a conduit to deliver a cooling fluid around the tubes inside of the shell between the upper and lower tube sheets; and, a conduit to remove cooling fluid therefrom.

A falling film freeze exchanger comprising a vessel having a top, bottom and side wall enclosing a liquid feed box in the bottom portion, and a cooling fluid space in the top portion separated by a tube sheet; a plurality of freeze tubes, supported by the tube sheet, extending downwardly in the feed box and out through holes larger than the freeze tubes in the vessel bottom; a conduit to deliver a liquid feed stream into the feed box; a conduit to deliver a cooling fluid into the cooling fluid space; and, a conduit to remove cooling fluid therefrom.

31 Claims, 11 Drawing Figures

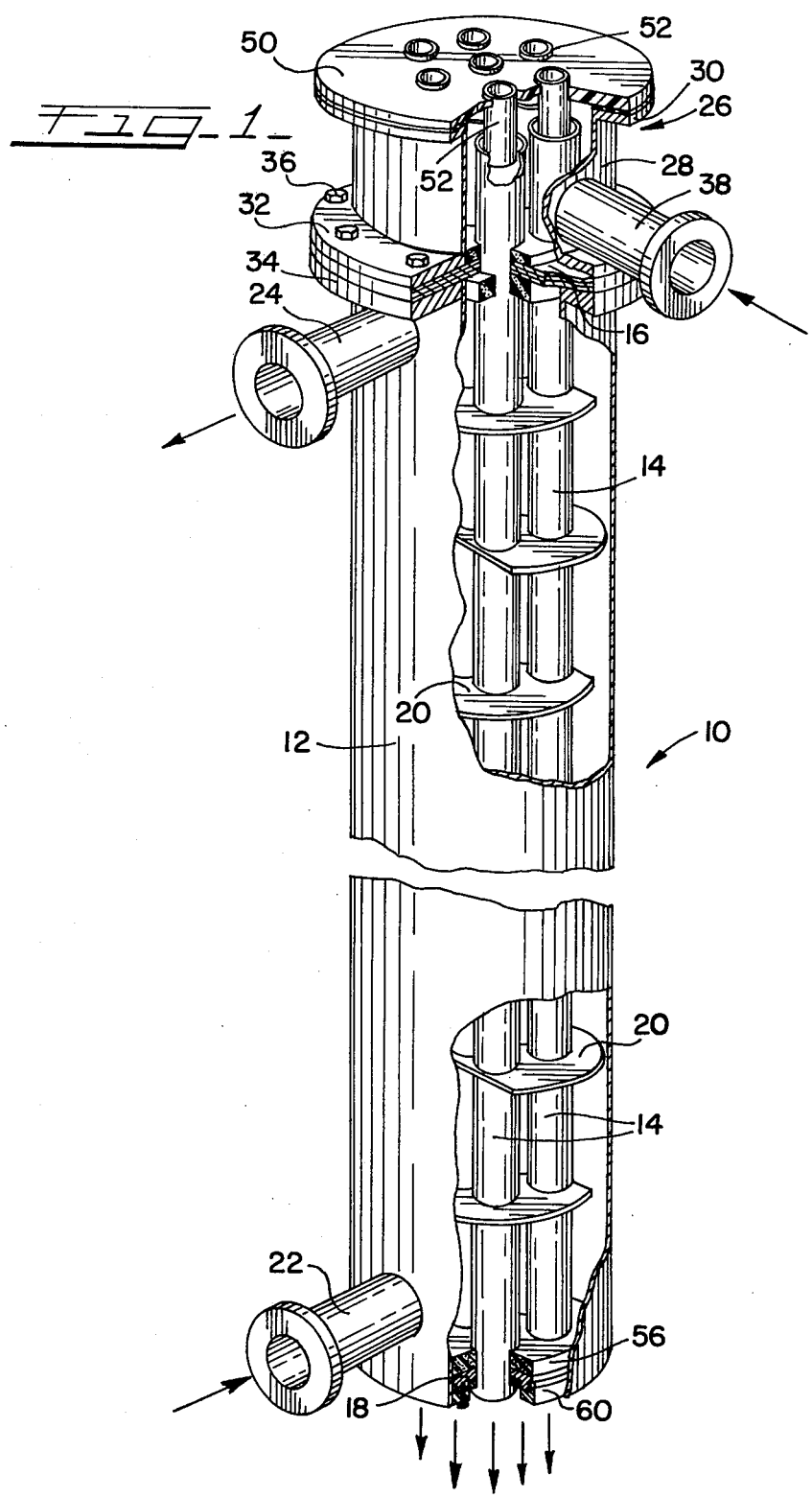

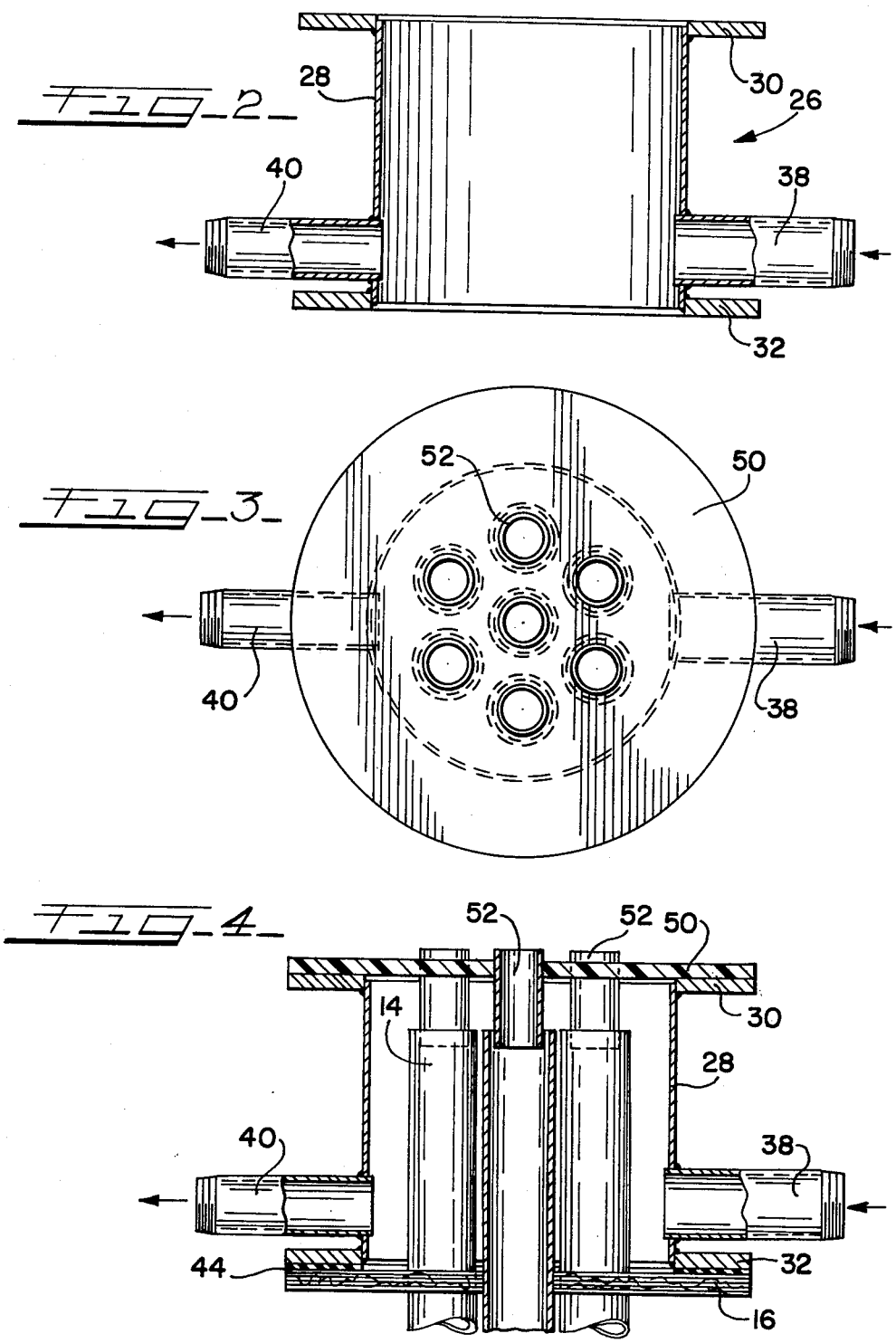

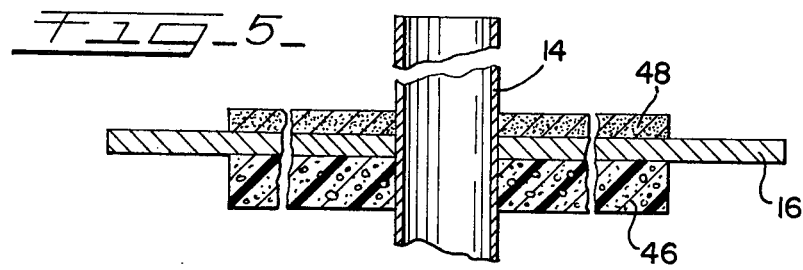
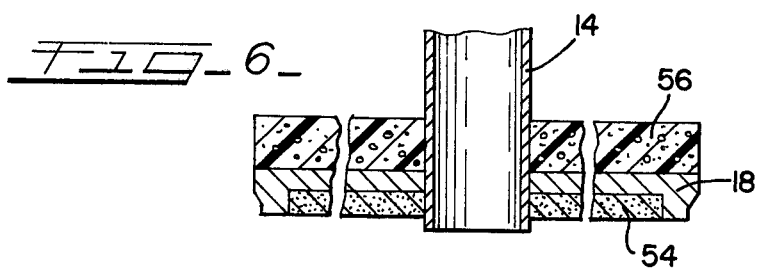
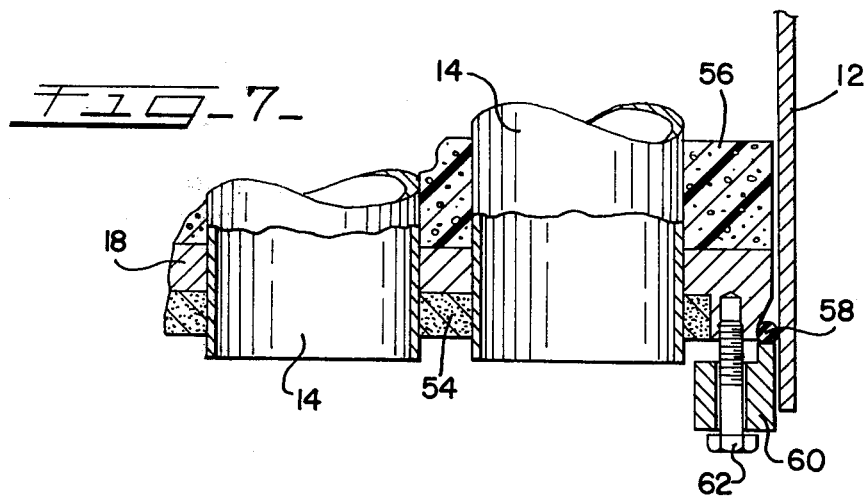

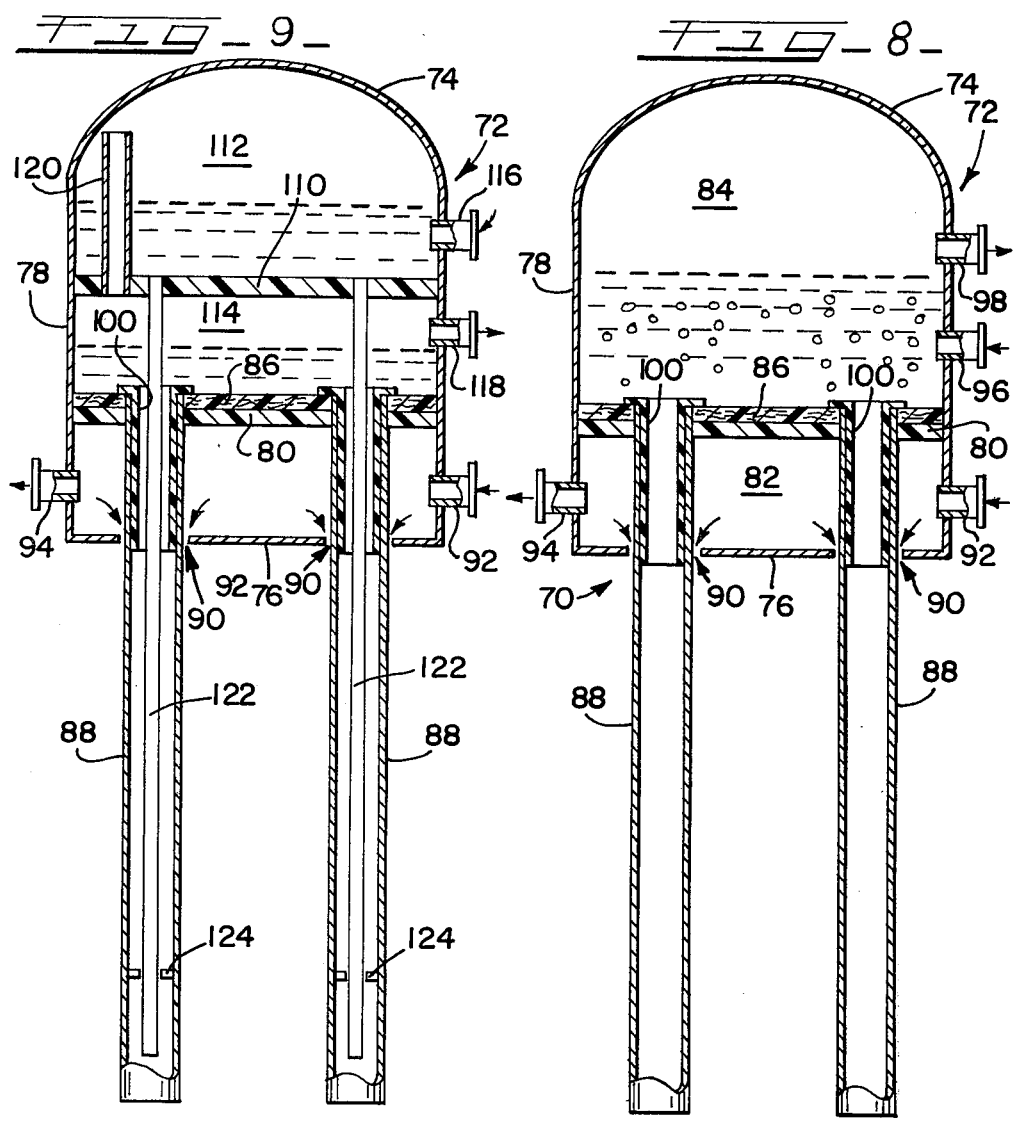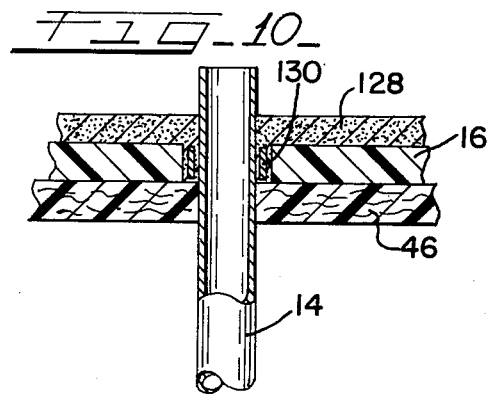

FALLING FILM FREEZE EXCHANGER

This invention relates to apparatus for concentrating a liquid mixture containing dissolved or suspended solids by freezing part of the liquid carrier or solvent.

BACKGROUND OF THE INVENTION

Various freeze processes have been developed to produce potable water from seawater or brackish water; to concentrate fruit juices such as orange juice and grape juice, vegetable juices such as tomato juice, and coffee; and to separate dissolved or suspended salts from the liquid carrier. See, for example, the U.S. Pat. Nos. of Ashley et al 3,070,969; Ashley 3,477,241; Ashley 3,501,924, Ganiaris 3,620,034, Johnson 3,664,145 and Ogman 4,091,635.

One of the major problems in freeze concentrating a liquid mixture has been the deposition of frozen solvent, usually ice, on the freeze exchanger surfaces. Buildup of ice lowers heat transfer and reduces the efficiency of the apparatus. In addition, if buildup of ice or some other frozen solvent continues it can plug the apparatus completely making it necessary to shut down to thaw the frozen material. Accordingly, a need exists for more suitable apparatus for freeze concentrating liquid mixtures containing a dissolved or suspended solid material.

SUMMARY OF THE INVENTION

One aspect of the subject invention provides an interior falling film freeze exchanger having a plurality of spaced apart vertical freeze tubes secured in, and penetrating, an upper and a lower tube sheet; a shell around the tube sheets and connected thereto; means to deliver a liquid feed stream into a feed box partially defined by the upper tube sheet; means to deliver a cooling fluid around the tubes inside of the shell between the upper and lower tube sheets; and, means to remove cooling fluid therefrom.

The ends of the freeze tubes desirably extend above the upper tube sheet to attain a more uniform liquid flow downward through the tubes. Also, a cover supported by the shell is desirably positioned above the upper tube sheet thereby further defining the feed box.

It is also generally beneficial to have a weir tube telescope with clearance into the top portion of each freeze tube. The weir tubes, for example, can project into the freeze tubes. Such an arrangement helps to achieve uniform flow through all of the freeze tubes regardless of how close they are to the feed box inlet.

The weir tubes can be supported by the cover which, incidentally, can contain a transparent area for viewing the feed box.

For many applications the lower ends of the freeze tubes need not be enclosed by the shell; instead, they can communicate directly with the exterior environment.

The upper and lower tube sheets are advantageously insulated against heat transfer through themselves. A layer of insulation can be located beneath but adjoining the bottom surface of the upper tube sheet and a layer of insulation can be located above but adjoining the upper surface of the lower tube sheet.

Since some liquids to be freeze concentrated are oxidized in contact with air, it is desirable to have a gas supply means communicate with the upper portion of the feed box so that an inert gas can be supplied thereto.

The exchanger also can be provided with a means to remove excess liquid feed from the feed box.

A second aspect of the invention provides an exterior falling film freeze exchanger comprising a vessel having a top, bottom, and side wall enclosing a liquid feed box in the bottom and a cooling fluid space in the top separated by a tube sheet; a plurality of freeze tubes, supported by the tube sheet, extending downwardly in the feed box and out through holes larger than the freeze tubes in the vessel bottom; means to deliver a liquid feed stream into the feed box; means to remove excess liquid feed from said space; means to deliver a cooling fluid into the cooling liquid box; and means to remove cooling fluid therefrom.

The freeze tubes are desirably arranged to communicate with the cooling fluid space. The lower ends of the freeze tubes are generally closed to prevent loss of cooling fluid therefrom.

Parts of the freeze exchanger are advantageously insulated. Thus, the tube sheet can be insulated, for example, by having insulation adjacent its upper surface. Furthermore, the freeze tube portions inside of the liquid feed box can be insulated.

In a variation of the exterior falling film freeze exchanger, a second tube sheet can be located in the vessel above the first tube sheet, thereby dividing the cooling liquid box into an upper section between the second tube sheet and the vessel cover and a lower section between the first and second tube sheets. The means for delivering cooling liquid can communicate with the upper section, and the means for removing cooling liquid can communicate with the lower section. A cooling liquid delivery tube can extend from the second tube sheet into each freeze tube. If desired, each cooling liquid delivery tube can communicate with the upper section. Furthermore, a tube can extend upwardly from the second tube sheet toward the vessel top so that the tube communicates with the upper and lower sections.

BRIEF DESCRIPTION OF THE DRAWINGS

FIG. 1 is an isometric view, partially broken away, of an interior falling film freeze exchanger provided by the invention.

FIG. 2 is a vertical sectional view of a portion of the feed inlet head of the freeze exchanger shown in FIG. 1.

FIG. 3 is a plan view of the freeze exchanger inlet head, shown in FIG. 2, with the cover in place.

FIG. 4 is a vertical view, partially in section, of the inlet head shown in FIG. 3.

FIG. 5 is a vertical sectional view of the top or upper tube sheet of the freeze exchanger shown in FIGS. 1 to 4.

FIG. 6 is a vertical sectional view of the bottom or lower tube sheet of the freeze exchanger shown in FIGS. 1 to 4.

FIG. 7 is a vertical view, partially in section and partially broken away, of a portion of the bottom tube sheet positioned in the shell.

FIG. 8 is a vertical sectional view of one embodiment of an exterior falling film freeze exchanger provided by the invention.

FIG. 9 is a vertical sectional view of a second embodiment of exterior falling film freeze exchanger provided by the invention.

FIG. 10 is a vertical sectional view of a portion of an upper tube sheet showing a means to join a tube to it.

FIG. 11 is a vertical sectional view of a portion of an upper tube sheet showing another means of joining a tube to it.

DETAILED DESCRIPTION OF THE DRAWINGS

To the extent it is practical and convenient, the same numbers will be used to identify the same or similar elements or parts in the various views of the drawings.

With reference to FIG. 1, one embodiment of novel freeze exchanger 10 provided by the invention has a circular cylindrical metal shell 12 and a plurality of metal freeze tubes 14. The tubes 14 are secured in position by an upper metal tube sheet 16 and a lower metal tube sheet 18. Vertically spaced apart baffles 20 are penetrated by the freeze tubes 14. Each baffle 20 is in the shape of a circular disk cut by a chord. Every other baffle is positioned 180° from the adjacent baffle so that a serpentine flow path for cooling fluid is formed in the shell 12. The baffles are desirably made of a polymeric material, such as polyvinyl chloride, so as to minimize heat flow from the shell 12 to the tubes 14. Generally, clearance space is provided between the freeze tubes and the holes in the baffles penetrated by the tubes so that cooling fluid can flow through the clearance space and cool the tubes.

Conduit 22 communicates with the lower interior space of shell 12 and is used to supply a cooling fluid to the shell interior. Cooling fluid is removed from the shell 12 upper interior space by conduit 24.

Included as part of shell 12 is removable feed inlet head 26 which has a cylindrical body 28, an upper flange 30 and a lower flange 32. Flange 34 is joined to the top edge of the main lower body of shell 12. Tube sheet 16 extends between flanges 32 and 34. Bolts 36 removably secure flange 32 to flange 34 with tube sheet 16 secured tightly therebetween. Conduit 38 communicates with the interior of feed inlet head 26 and is used to feed a liquid feed stream to the freeze exchanger. Excess liquid feed is removed from feed inlet head 26 by conduit 40 (FIGS. 2 to 4).

The upper tube sheet 16 is desirably made of a non-metallic material such as plywood or a polymeric material having sufficient strength and inertness to be suitable for use in the freeze exchanger. A rubber gasket 44 (FIG. 4) is desirably positioned between flange 32 and tube sheet 16.

An insulating layer 46 (FIG. 5), such as a layer of polyvinyl chloride closed cell foam, is attached to the bottom of tube sheet 16 to retard heat flow. In addition, a polymeric layer 48 is placed on top of tube sheet 16 to secure the tubes in place in the tube sheet. A self curing epoxy resin can be used for layer 48.

A cover 50, desirably made of a clear or colorless solid acrylic polymer, is positioned on top of flange 30 (FIGS. 3 and 4) to close the inlet head 26. Short weir tubes 52 are vertically joined to cover 50. The weir tubes 52 can be open at both ends or closed at one or both ends as may be dictated by the chemical and physical properties of the liquid feed. Weir tubes 52 telescope with clearance into the top of freeze tubes 14.

The lower tube sheet 18 (FIGS. 6 and 7) is recessed in the bottom to receive a layer of a polymeric material 54, such as an epoxy resin, to secure the freeze tubes 14 in position. A layer of insulation material 56 is joined by a suitable adhesive to the top surface of lower tube sheet 18. An O-ring rubber seal 58 is positioned around the tapered outer edge of tube sheet 18. Retaining ring 60 is secured in place by bolts 62 which extend through holes in ring 60 into threaded holes in lower tube sheet 18. Ring 60 holds and presses O-ring 58 securely in place.

The interior falling film freeze exchanger illustrated by FIGS. 1 to 7 can be used to concentrate a wide variety of liquid feed streams, including fruit juices, vegetable juices, seawater and brackish water.

A feed stream, usually aqueous, is introduced into inlet head 26 by conduit 38. The liquid level in inlet head 26 rises until the liquid flows over the top edge of freeze tubes 14 and down the tubes between weir tubes 52. The weir tubes 52 level out flow through the freeze tubes 14 so that each tube receives a uniform supply of liquid. The volume of feed stream supplied by conduit 38 is generally slightly in excess of that which can flow per unit of time through tubes 14. The excess feed stream is withdrawn by conduit 40 and it can be redirected into the feed stream by suitable conduit means not shown.

A cooling fluid is introduced into the freeze exchanger by inlet conduit 22 and it is removed by conduit 24. The cooling fluid may be a refrigerant gas such as ammonia, or a Freon gas such as dichlorotetrafluoroethane, or it may be a cooled liquid such as propylene glycol or ethanol.

As the liquid feed flows downwardly in freeze tubes 14 as a thin film on the walls of the tubes, the liquid becomes cooled and part of the water freezes into ice crystals. The liquid feed containing ice crystals flows out of the bottom of tubes 14 into a suitable receptacle not shown. The liquid feed can then be returned to the freeze exchanger to produce more ice. The ice crystals can ultimately be separated from the liquid and either be discarded or utilized depending on the purpose for which the liquid is concentrated. For example, if seawater is concentrated the ice slurry is recovered, washed and melted to obtain potable water. However, if orange juice is being concentrated the ice slurry is discarded.

FIG. 8 illustrates an exterior falling film freeze exchanger 70. The freeze exchanger 70 includes a vessel 72 having a top 74, bottom 76, and side wall 78. Tube sheet 80 divides the vessel 72 interior into a liquid feed box space 82 in the bottom portion and a cooling fluid space 84 in the top portion. A layer of insulation 86, such as closed cell polyvinyl chloride foam, is bonded to the top surface of tube sheet 80.

A plurality of freeze tubes 88, joined near their top ends to tube sheet 80, extend downwardly through oversized holes 90 in the vessel bottom 76. The clearance between holes 90 and tubes 88 provides space through which a film of feed liquid flows from feed box 82 downwardly along the exterior surface of tubes 88. The bottom end of each freeze tube 88 is closed. Liquid feed is supplied to feed box 82 by conduit 92 and the excess liquid is removed therefrom by conduit 94 and recycled by means not shown.

A cooling fluid, desirably a liquefied refrigerant gas such as Freon, is fed to the cooling fluid space 84 by conduit 96 and the resulting vapor is withdrawn by conduit 98. Inserts or liners 100, made of a low heat conductance material, are placed in the upper portion of freeze tubes 88 to prevent ice from forming on the freeze tube portions inside the feed box.

As the film of liquid feed flows downwardly on the exterior surface of freeze tubes 88 it is cooled by heat exchange with liquid refrigerant in the tubes. Ice crystals form in the liquid film and grow as it flows downwardly on the tubes and then off the end to fall into a receiving tank not shown. The ice slurry can be separated from the concentrated liquid and be either used or discarded depending on the desired product from the concentration. The liquid can be recycled to feed box 82 for further concentration.

FIG. 9 illustrates a second embodiment of falling film freeze exchanger provided by the invention. It is similar in many respects to the embodiment shown in FIG. 8. Common or similar elements will not be described again.

As is shown in FIG. 9, a second tube sheet 110 is positioned in vessel 72 to divide the cooling liquid box into an upper space 112 and a lower space 114. Conduit 116 feeds a liquefied refrigerant gas to upper space 112 and conduit 118 removes it. Tube 120 extends upwardly from second tube sheet 110 to provide vapor communication between upper space 112 and lower space 114.

Tubes 122 are joined at their upper ends to second tube sheet 110. Tubes 122 extend downwardly inside, and end near the bottom of, freeze tubes 88. Spacers 124 maintain tubes 122 centrally located in freeze tubes 88.

When liquefied refrigerant is supplied by conduit 116 to upper space 112, the refrigerant flows down tubes 122 and into tubes 88 thereby filling them and at least part of the lower space 114. As liquid feed flows out holes 90 and down the exterior surface of freeze tubes 88, it is cooled by heat exchange to the refrigerant. Ice crystals form in the liquid before it falls off the end of the freeze tubes into a collecting tank.

FIG. 10 illustrates an alternative way to bond a freeze tube 14 into a tube sheet 16. Oversized holes are provided in tube sheet 16 to receive freeze tubes 14. Insulation layer 46 is then positioned beneath tube sheet 16. A suitable binder 128, such as an epoxy resin, is then poured into the oversized holes. Before the binder hardens a metal ring 130 is inserted in the hole. Then, further binder is deposited on tube sheet 16 to produce layer 128.

An alternative way of joining freeze tubes 14 to tube sheet 16 is illustrated by FIG. 11. In this embodiment, the upper ends of freeze tubes 14 are rolled tightly against the wall of holes in the tube sheet. Since this may roughen the inside surface of the freeze tubes, a polymeric tube 132 is telescoped into the upper end of each freeze tube 14.

The surfaces of the freeze tubes which contact the liquid feed are desirably highly finished.

The physical size of the described apparatus and the operating conditions in the freeze exchanger greatly influence crystal growth. These factors are important since it is generally desirable to produce large crystals, which are readily washed to remove entrained concentrate. Some of the factors which affect crystal growth, and which are to be considered in building a specific freeze concentrator according to the invention, are: (1) optimum subcooling of the liquid mixture to provide maximum crystal size; (2) residence time; (3) the liquid mixture flow rate; (4) the temperature difference between the liquid mixture and the cooling fluid; (5) the length of heat transfer surface, since it determines residence time in the freeze exchanger and the amount of subcooling; (6) variations in seed crystal quantity; (7) turbulence of the liquid mixture; and (8) the heat flux, which affects subcooling of the liquid mixture. These are some of the major factors which influence crystal formation and growth.

The foregoing detailed description has been given for clearness of understanding only, and no unnecessary limitations should be understood therefrom, as modifications will be obvious to those skilled in the art.

What is claimed is:

1. A falling film freeze exchanger comprising:
   a plurality of spaced apart vertical freeze tubes secured in, and penetrating, an upper and a lower tube sheet;
   a shell around the tube sheets and connected thereto;
   the ends of the freeze tubes extending above the upper tube sheet;
   a weir tube telescoping, with clearance, the top portion of each freeze tube;
   means to deliver a liquid feed stream into a feed box partially defined by the upper tube sheet; and
   means to deliver a cooling fluid around the tubes inside of the shell between the upper and lower tube sheets; and
   means to remove cooling fluid therefrom.

2. A falling film freeze exchanger according to claim 1 including a cover, above the upper tube sheet, supported by the shell.

3. A falling film freeze exchanger according to claim 2 in which the feed box is between the upper tube sheet and the cover.

4. A falling film freeze exchanger according to claim 2 in which the weir tubes are supported by the cover.

5. A falling film freeze exchanger according to claim 2 in which the cover contains a transparent area for viewing the feed box.

6. A falling film freeze exchanger according to claim 1 in which the upper and lower tube sheets are insulated against heat transfer therethrough.

7. A falling film freeze exchanger according to claim 6 in which a layer of insulation is located beneath but adjoining the bottom surface of the upper tube sheet, and a layer of insulation is located above but adjoining the upper surface of the lower tube sheet.

8. A falling film freeze exchanger according to claim 1 in which a gas supply means communicates with the upper portion of the feed box.

9. A falling film freeze exchanger according to claim 1 in which the lower ends of the freeze tube are not enclosed by the shell.

10. A falling film freeze exchanger according to claim 1 in which the freeze tubes are removably bonded to the tube sheets by a solid polymeric material.

11. A falling film freeze exchanger according to claim 1 in which weir tubes project into the freeze tubes.

12. A falling film freeze exchanger according to claim 1 including means to remove excess liquid from the feed box.

13. A falling film freeze exchanger comprising:
   a plurality of spaced apart vertical freeze tubes secured in, and penetrating, an upper and a lower tube sheet;
   a cover above the upper tube sheet;
   a shell around the tube sheets and connected thereto, with said cover supported by the shell;
   the upper ends of the freeze tubes extending above the upper tube sheet and the lower ends of the freeze tubes not being enclosed by the shell;
   means to deliver a liquid feed stream into a feed box between the upper tube sheet and the cover; and
   means to deliver a cooling fluid around the tubes inside of the shell between the upper and lower tube sheets and means to remove cooling fluid therefrom.

14. A falling film freeze exchanger according to claim 13 in which the upper and lower tube sheets are insulated against heat transfer therethrough.

15. A falling film freeze exchanger according to claim 14 in which a layer of insulation is located beneath but adjoining the bottom surface of the upper tube sheet and a layer of insulation is located above but adjoining the upper surface of the lower tube sheet.

16. A falling film freeze exchanger according to claim 13 including a weir tube telescoping with clearance the top portion of each freeze tube.

17. A falling film freeze exchanger according to claim 16 in which weir tubes project into the freeze tubes.

18. A falling film freeze exchanger according to claim 13 including means to remove excess liquid feed from the feed box.

19. A falling film freeze exchanger according to claim 13 in which a gas supply means communicates with the upper portion of the feed box.

20. A falling film freeze exchanger according to claim 13 in which the cover contains a transparent area for viewing the feed box.

21. A falling film freeze exchanger according to claim 13 in which the freeze tubes are removably bonded to the tube sheets by a solid polymeric material.

22. A falling film freeze exchanger comprising:
a vessel having a top, bottom and side wall enclosing a liquid feed box in the bottom portion, and a cooling fluid space in the top portion separated by an insulated tube sheet;
a plurality of freeze tubes, supported by the tube sheet, extending downwardly in the feed box and out through holes larger than the freeze tubes in the vessel bottom;
means to deliver a liquid feed stream into the feed box; and
means to deliver a cooling fluid into the cooling fluid space and means to remove cooling fluid therefrom.

23. A falling film freeze exchanger according to claim 22 in which the tube sheet has insulation adjacent its upper surface.

24. A falling film freeze exchanger comprising:
a vessel having a top, bottom and side wall enclosing a liquid feed box in the bottom portion, and a cooling fluid space in the top portion separated by a tube sheet;
a plurality of freeze tubes, supported by the tube sheet, extending downwardly in the feed box and out through holes larger than the freeze tubes in the vessel bottom;
the freeze tube portions inside of the liquid feed box being insulated;
means to deliver a liquid feed stream into the feed box; and
means to deliver a cooling fluid into the cooling fluid space and means to remove cooling fluid therefrom.

25. A falling film freeze exchanger comprising:
a vessel having a top, bottom and side wall enclosing a liquid feed box in the bottom portion, and a cooling fluid space in the top portion separated by a tube sheet;
a plurality of freeze tubes, supported by the tube sheet, extending downwardly in the feed box and out through holes larger than the freeze tubes in the vessel bottom;
means to deliver a liquid feed stream into the feed box;
means to remove excess liquid feed from the feed box; and
means to deliver a cooling fluid into the cooling fluid space and means to remove cooling fluid therefrom.

26. A falling film freeze exchanger comprising:
a vessel having a top, bottom and side wall enclosing a liquid feed box in the bottom portion, and a cooling fluid box in the top portion separated by a first tube sheet;
a second tube sheet located in the vessel above the first tube sheet, thereby dividing the cooling fluid box into an upper section between the second tube sheet and the vessel cover and a lower section between the first and second tube sheets;
a plurality of freeze tubes, supported by the tube sheet, extending downwardly in the feed box and out through holes larger than the freeze tubes in the vessel bottom;
means to deliver a liquid feed stream into the feed box;
means to deliver a cooling fluid into the cooling fluid box and means to remove cooling fluid therefrom;
the means for delivering cooling liquid communicating with the cooling fluid box upper section and the means for removing cooling liquid communicating with the cooling fluid box lower section; and
a cooling liquid delivery tube extending from the second tube sheet into each freeze tube.

27. A falling film freeze exchanger according to claim 26 in which:
each cooling liquid delivery tube communicates with the upper section.

28. A falling film freeze exchanger according to claim 27 in which:
a tube extends upwardly from the second tube sheet towards the vessel top, and the tube communicates with the upper and lower sections.

29. A falling film freeze exchanger according to claim 26 in which the freeze tube ends are closed.

30. A falling film freeze exchanger according to claim 29 in which the freeze tube lower portions are not enclosed.

31. A falling film freeze exchanger according to claim 26 in which the portion of the freeze tubes inside the liquid feed box are insulated.

* * * * *